(12) United States Patent
Stoyanov et al.

(10) Patent No.: US 6,580,388 B1
(45) Date of Patent: Jun. 17, 2003

(54) CALCULATION METHODOLOGY FOR COMPLEX TARGET SIGNATURES

(75) Inventors: Aleksandr J. Stoyanov, Hyattsville, MD (US); Yuri J. Stoyanov, Hyattsville, MD (US); Valiant F. Tsang, Rockville, MD (US); William R. Bird, Dayton, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/988,652

(22) Filed: Nov. 20, 2001

(51) Int. Cl.[7] .............................. G01S 13/88; G01S 7/41
(52) U.S. Cl. ......................... 342/192; 342/90; 342/195
(58) Field of Search ......................... 342/90, 192, 194, 342/195, 173

(56) References Cited

U.S. PATENT DOCUMENTS

| | | | |
|---|---|---|---|
| 4,707,697 A | | 11/1987 | Coulter et al. |
| 4,992,797 A | * | 2/1991 | Gjessing et al. ............ 342/192 |
| 5,227,801 A | | 7/1993 | Pierce |
| 5,386,737 A | | 2/1995 | Soeder et al. |
| 5,392,050 A | * | 2/1995 | Guerci et al. ................. 342/90 |
| 5,457,463 A | | 10/1995 | Vencel et al. |
| 5,767,802 A | | 6/1998 | Kosowsky et al. |
| 5,910,787 A | | 6/1999 | Berg et al. |
| 5,936,568 A | | 8/1999 | Berg et al. |
| 6,246,355 B1 | | 6/2001 | Miceli et al. |

OTHER PUBLICATIONS

Salem, F. A., "An analytic model for estimating the average radar cross section (RCS) for identifying the Flickering Target," Electrotechnical Conference, 1996. MELECON '96., May 1996, 8th , pp 1718–1720, vol. 3, ISBN 0–7803–3109–5.*

Tice, T. E., "An overview of radar cross section measurement techniques," Instrumentation and Measurement Technology Conference, IMTC–89. Conference Record., 6th IEEE, pp. 344–346, Apr. 1989.*

* cited by examiner

Primary Examiner—Ian J. Lobo
(74) Attorney, Agent, or Firm—Howard Kaiser (57) ABSTRACT

A monostatic radar signature is estimated of a sample object which is made of the same material as the target object. Using this monostatic radar signature estimation, the radar cross-section (RCS) per unit area is calculated for the sample object as a function of aspect angle and frequency. The target object is modeled so as to represent plural three-dimensional elements within the target object, and so as to associate an RCS per unit area value with every three-dimensional scattering element. An incoherent summation is performed of the three-dimensional scattering elements as a function of azimuth and frequency. One or more monostatic radar signatures can be estimated, and, correspondingly, one or more RCS per unit area values can be calculated. Every RCS per unit area value thus obtained can be incorporated in the modeling of the target object.

12 Claims, 7 Drawing Sheets

CALCULATION METHODOLOGY FOR COMPLEX TARGET SIGNATURES

BACKGROUND OF THE INVENTION

The present invention relates to electromagnetic and acoustic signatures of objects, more particularly to methods and apparatuses for determining such signatures for complex objects.

Signature reduction of large systems and vehicles is critical to achieving the desired effectiveness of future military systems. As the U.S. Navy progresses towards low observable system designs, new and innovative methods and technologies are needed to meet growing signature reduction needs. The radar or acoustic signature of a body such as a three-dimensional (3D) complex structure can be reduced by shape modification and/or by application of radar or acoustic absorbing material.

Existing numerical methods and computer codes are not adequate or sufficiently accurate for such purposes, since the signature levels have reached a point where second order effects become important. Typically, signature prediction techniques like Physical Optics (PO) or Physical Theory of Diffraction (PTD) are high frequency approximations, and exact methods like Method of Moments (MoM) or Finite Difference Time Domain (FDTD) are computationally intensive and impractical for large objects. Moreover, in many cases, absorbing materials or systems designed to reduce signature are difficult (or impossible) to model accurately using available prediction models, and the only recourse is to use costly full-scale measurements.

In response to U.S. Navy needs to reduce stack and antenna signatures of U.S. Navy ships, Carderock Division of the Naval Surface Warfare Center (NSWCCD) is in the process of developing a low observable (LO) exhaust system with satellite communication (SATCOM) antennae embedded in the associated topside structures. Concept designs for a Low Observable Multi-Function Stack (LMS) are being, developed by the U.S. Navy as part of a FY98 Advanced Technology Demonstration (ATD) program. The present invention is a product or spin-off of the research and development work of the LMS project.

The feasibility of meeting future ship Radar Cross-Section (RCS) signature goals with the LMS was evaluated by the U.S. Navy by performing parametric studies of the LMS shroud shape. The parametric studies showed that the LMS shroud would require radar absorption. A Radar-Absorbing Structural (RAS) material satisfying Radar Cross-Section (RCS) requirements was proposed and developed for the LMS. Bistatic measurements (the accepted method of characterizing the performance of radar absorbing materials) of the proposed LMS material showed that it satisfied the nominal radar attenuation requirements.

A simplified scaled version of the LMS was fabricated using proposed LMS material to evaluate the monostatic radar scattering response. The scaled version of the LMS was a truncated pyramid with approximate dimensions of 6 feet wide by 6 feet long and 3 feet high. The resulting RAS truncated pyramid was measured at the Pt. Mugu radar reflectivity compact range. The RCS measurements of the truncated pyramid showed surprisingly large backscattering from the proposed LMS material.

Attempts to reproduce the RCS measurement results of the truncated pyramid using the measured bistatic absorption of the LMS material as an input to the high frequency Radar Target Signature (RTS) code were not successful. Within the RTS code, the effect of radar absorbing material (RAM) on the radar signature of a scatterer is determined by extracting radar signal attenuation values from a table of measured or calculated bistatic absorption data.

The truncated pyramid or any other target is considered in the RTS code as a collection of basic geometrical shapes, called "primitives" (such as flat plates, elliptic cylinders, truncated cones, etc.), with the total signature of the object being simply the coherent sum of the signature contributions of each of the individual primitives. The assignment of RAM signal attenuation values to any primitive shape on the model geometry is one of the RTS features. For the assigned material, radar signal attenuation is defined as a specular bistatic response for the appropriate radar frequency, incidence angle, and polarization.

However, some materials and structures (such as the proposed LMS material) have a significant unexpected non-specular scattering with undesired monostatic radar returns. The effect of the non-specular scattering is to dominate what would normally have been very low RCS aspects of the truncated pyramid, thus controlling it's median RCS. A problem thus presents itself as to how to predict such monostatic non-specular radar returns, and to identify RCS signatures of complex entities such as ship size systems made of such materials and other non-uniform structures.

SUMMARY OF THE INVENTION

In view of the foregoing, it is an object of the present invention to provide method and apparatus for rendering signature determinations for complex entities which do not admit of conventional techniques (such as involving computer modeling) for accomplishing such purposes.

It is a further object of the present invention to provide such method and apparatus so as to avoid the necessity of effectuating full-scale measurements of such complex entities.

It is another object of this invention to provide such method and apparatus for rendering signature determinations for complex entities which, due to their material and/or structure, have associated therewith radar cross-section signatures characterized by significant monostatic non-specular radar returns.

The present invention provides a methodology for determining a signature of a complex object. An important benefit of the present invention is that it accounts for non-specular scattering and the accompanying monostatic radar returns.

A notable feature of the present invention, unknown in the art, is the extrapolation of signature information from one object to another object. The inventive methodology uniquely includes an extrapolation of the radar cross-section (RCS) signature (or acoustic signature, for acoustic applications) of a "sample" object (such as a scaled-down model of the LMS shroud, a flat RAS panel, or a section of an antenna array) to a full-scale "complex" object (such as a ship size system) which the sample object represents. Typically according to this invention, the sample object is simpler than is the complex object. According to a principle of the present invention, inasmuch as the present invention's "three-dimensional scattering elements" each represent a part of the complex object (e.g., system), the inventive methodology can use either or both of measured sample object signatures and predicted sample object signatures to make extrapolations.

The known methodology for predicting signature data involves (i) taking measured or calculated bistatic signature data from a sample object, and (ii) applying such bistatic signature data to a target object so as to obtain a coherent summation of individual primitives. The present invention provides a new methodology, according to which signature data is extrapolated from a sample object to a complex object (e.g., target). The present invention involves (i) taking measured or calculated monostatic signature data from a sample object, and (ii) extrapolating such monostatic signature data to a complex object so as to obtain an incoherent summation of three-dimensional scattering elements, wherein the three-dimensional scattering elements are reflective of the monostatic signature data. Advantageously, the inventive methodology succeeds in predicting radar-cross section signatures of complex objects which account for monostatic non-specular radar returns from such complex objects; the inventive methodology thus succeeds where the known methodology fails.

According to typical embodiments of this invention, the inventive methodology comprises the actions and rudiments set forth in the following four paragraphs. It is emphasized that the present invention succeeds in estimating either an electromagnetic (e.g., radar) scattering signature or an acoustic scattering signature.

Firstly, the inventive practitioner develops an estimate of the signature (e.g., radar scattering signature or acoustic scattering signature, as the case may be) of a sample object, based on (i) an accurate measurement of the signature of the sample object, or (ii) a high fidelity prediction of the signature of the sample object. According to this invention, the sample object can be any of variously shaped objects, e.g., a plate, a simplified scale model or another shape. The sample object is constructed or composed of the same material as the compound target.

Secondly, based on the estimated signature of the sample object, the inventive practitioner calculates the unit area RCS (for radar scattering signature applications) or the unit area acoustic target strength (for acoustic scattering signature applications) of the sample object as a function of aspect angle and frequency.

Thirdly, the inventive practitioner develops computer geometry of the full size compound target. The inventive practitioner models such geometry using "3-dimensional (3-D) scattering elements," each scattering element representing a specific section (e.g., region or subsystem) of the compound target. The size(s) of the scattering elements will vary depending on the accuracy required, the area of the system, and the shape of the compound target.

Fourthly, using the respective RCS per unit area (for radar scattering signature applications) or acoustic target strength per unit area (for acoustic scattering signature applications) derived from the measured or predicted signature component of the sample object, the inventive practitioner assigns an RCS value (for radar scattering signature applications) or an acoustic target strength value (for acoustic scattering signature applications) in correspondence to each 3-D scattering element used during the estimation of the compound target signature. The RCS estimations (for radar scattering signature applications) or acoustic target strength estimations (for acoustic scattering signature applications) of the compound target use incoherent summation of the 3-D scattering elements as a function of azimuth and frequency.

Accordingly, typical embodiments of the present invention provide a method for determining the radar signature of a target object. The inventive method comprises: (a) rendering a sample object so as to be characterized by the same material as the target object; (b) performing an estimation of the radar signature of the sample object; (c) based on the performing of an estimation, calculating a radar cross-section per-unit-area value for the sample object as a function of aspect angle and frequency; (d) modeling the target object, wherein the modeling includes (i) representing a plurality of three-dimensional elements, and (ii) assigning a per-unit-area signature value to each three-dimensional scattering element; and, (e) performing a summation of the three-dimensional scattering elements as a function of azimuth and frequency. The sample object can have any of diverse shapes, such as a flat plate shape or a scale model shape (i.e., a shape which, usually in simplified form, represents a scale model of the target object).

Generally in accordance with the present invention, the performing of an estimation of the radar signature of a sample object involves measuring and/or predicting. That is, the performing of an estimation of the radar signature includes either or both of: (i) obtaining a measurement of the monostatic backscattering radar cross-section of the sample object; and, (ii) obtaining a high-fidelity prediction of the monostatic backscattering radar cross-section of the sample object. Typically according to this invention, the performing of a summation of the three-dimensional scattering elements as a function of azimuth and frequency includes performing an incoherent summation of the three-dimensional scattering elements as a function of azimuth and frequency.

The present invention admits of practice with respect to various kinds of signatures. In accordance with many inventive embodiments, the inventive method is for extrapolating signature information from a sample object to a target object. The inventive method comprises (a) evaluating the signature per unit area of said sample object as a function of aspect angle and frequency, (b) generating a computer model of said target object, and (c) incoherently summing three-dimensional scattering elements as a function of azimuth and frequency. The computer model represents the target object as including the plural three-dimensional scattering elements. Each three-dimensional scattering element is characterized by the signature cross-section per unit area. According to typical inventive practice, if the signature is an electromagnetic signature, then the signature per unit area is an electromagnetic signature cross-section per unit area; hence, if the electromagnetic signature is a radar signature, then the electromagnetic signature per unit area is a radar cross-section per unit area. If the signature is an acoustic signature, then the signature per unit area is an acoustic target strength per unit area.

The present invention enables accurate and effective signature estimates of a complex system or structure that either does not exist or is difficult to measure, and whose signature is influenced by scattering mechanisms that cannot be effectively modeled analytically. This invention provides a methodology for ascertaining the signature of a full-scale object by extrapolating the radar cross section (RCS) or acoustic signature of a sample object (such as a scaled-down model of a full scale object, a flat panel section of material, or a section of an antenna array) to the full-scale object (such as a ship size system). The inventive methodology can use either/both measured and predicted sample object signatures to make the extrapolations.

The present invention's methodology allows accurate predictions of electromagnetic or acoustic signatures of compound structures, targets or systems of practically any composition and complexity. It is particularly useful in the areas of low observable (LO) target signatures, where all other analytical methods fail to provide meaningful results.

Among the notable advantages of the present invention's methodology is low cost. Furthermore, the present invention affords straightforward and accurate signature evaluation of a complex structure or system of any size. Especially valuable is the present invention's ability to evaluate the effectiveness of signature reduction techniques for future systems without spending precious resources on fabrication and measurement of a full-size target or test system.

Previously known methods and computer models fail to provide accurate results because of inherent approximations (e.g., high frequency codes such as RTS) or computational limitations due to computer memory requirements and processing speed (e.g., Method of Moments codes or Finite Difference Time Domain codes). The present invention was motivated at least in part to overcome these and other shortcomings.

The methodology in accordance with the present invention is being developed and tested by the U.S. Navy for Radar Cross Section (RCS) predictions of the scaled down and ship-size versions of the Low Observable Multifunction Stack (LMS). It is contemplated that the inventive methodology will be used for RCS Signature analyses and reduction, as well as Acoustic Signature analyses and reduction, of military vehicles.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

The inventive methodology can be used for estimating a radar scattering signature or an acoustic scattering signature. The following examples, illustrative of the inventive methodology, involve RCS signature prediction and extrapolation of an aluminized LMS scaled model shroud. In the light of this disclosure, the ordinarily skilled artisan will be capable of practicing the present invention not only in association with electromagnetic signatures but also in association with acoustic signatures.

Figure 1:
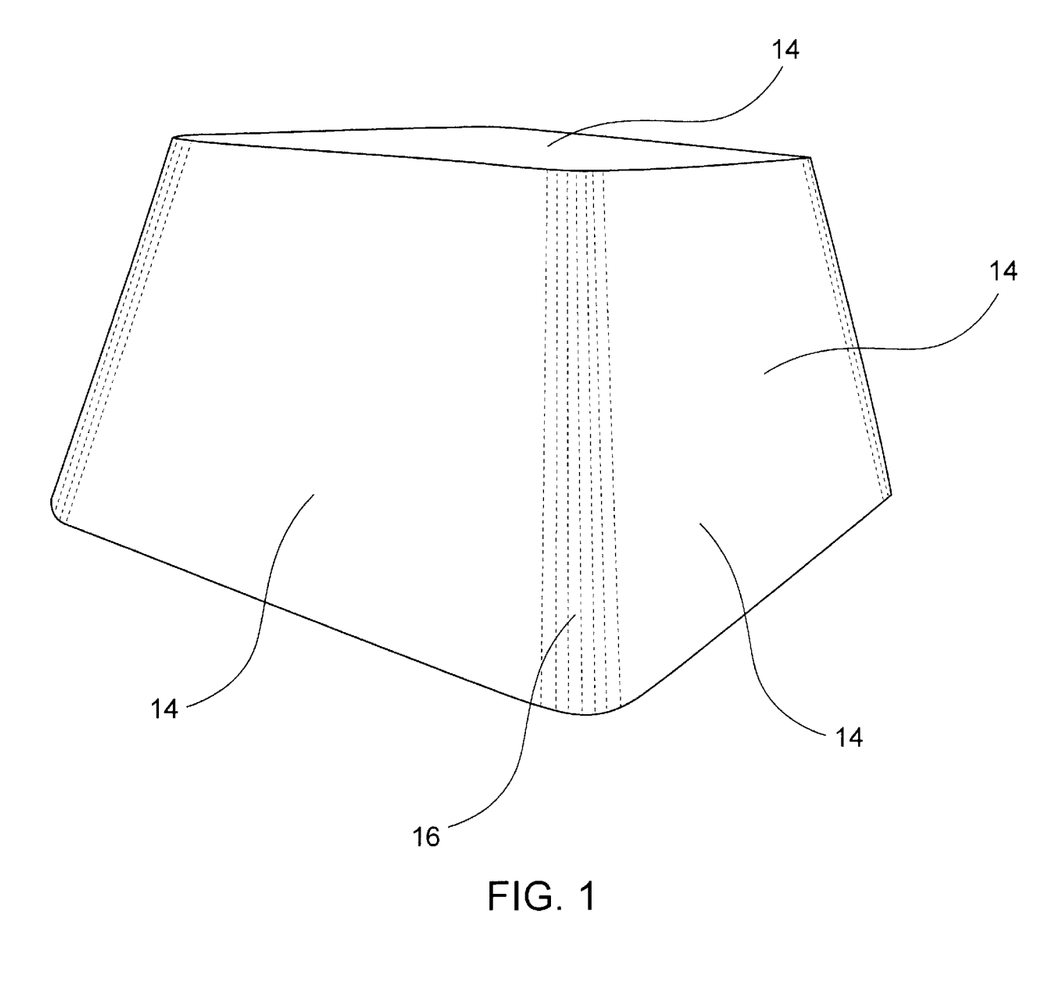
FIG. 1 is a diagraminatic perspective view, based on a photograph, of an aluminized LMS scaled model shroud.

Referring now to FIG. 1, an aluminized LMS scaled model shroud 10 is shown ready for measurements. This scaled model shroud, which describes a kind of "pyramid" shape, is one which was used for U.S. Navy testing at the Pt. Mugu radar reflectivity compact range. Scaled model LMS shroud 10 includes planar (flat) faces 14 and rounded edges (corners) 16. Each rounded corner 16 represents the junction of two flat faces 14.

Figure 2:
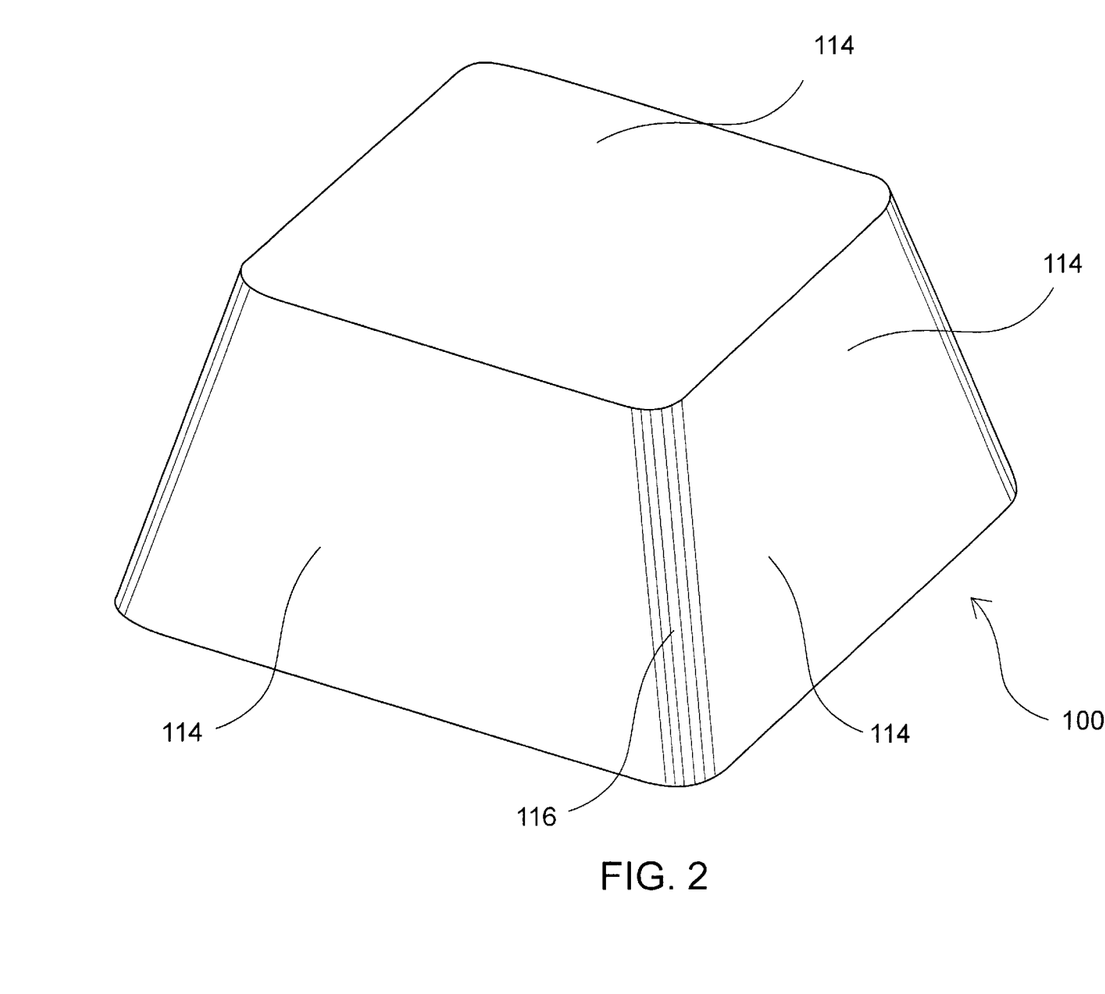
FIG. 2 is a diagrammatic perspective view, based on a computer rendering, of a conventional radar target signature (RTS) geometry model.

With reference to FIG. 2, shown is the basic, unfaceted computer-generated pyramidic shroud geometry 100. In analogous fashion to the actual scaled model shroud 10, computer-generated shroud 100 includes planar (flat) faces 114 and rounded edges (corners) 116. Each rounded corner 116 represents the junction of two flat faces 114.

To make the conventional RCS predictions of the scaled model LMS pyramidic shroud 10, a "faceted" geometry computer model (not shown) was prepared in conformance with the "unfaceted" (or, "basic") computer-generated pyramidic shroud geometry 100 (which, in turn, conforms with the actual shroud geometry 10), as input for the RTS prediction code. Each "facet" represented a "primitive" according to the conventional RTS prediction technique. Perfectly conducting material of shroud 10 was assumed for predicting the RCS signature based on the faceted model version of the computer-generated shroud geometry 100.

Figure 3:
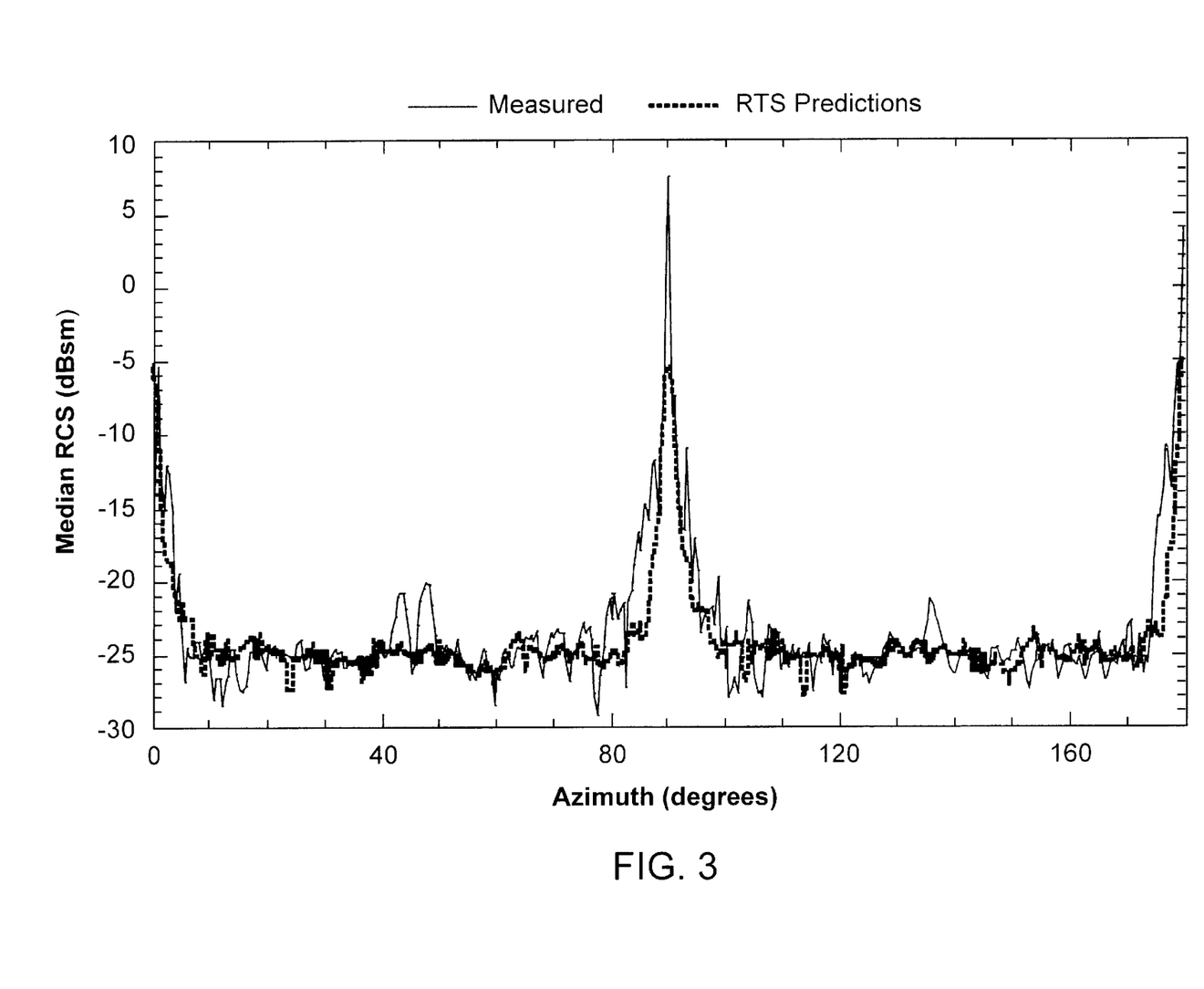
FIG. 3 is a graphical representation of a comparison of the measured RCS of a conducting pyramid and the predicted RCS of the conducting pyramid in accordance with conventional radar target signature (RTS) technique; the graph compares measured and predicted RCS of a perfect electrical conductor (PEC) pyramid at 8.5–9.5 GHz, HH-polarization.

Reference now being made to FIG. 3, the graph illustrates a comparison of (i) the measured RCS signatures of the shroud versus (ii) the conventionally predicted RCS signatures of the shroud (i.e., the RCS signatures which were obtained according to conventional RTS methodology). Notable are the differences between these predicted RCS signatures and the measured RCS signatures, especially at 45 degrees, 90 degrees and 135 degrees.

Generally, the conventionally predicted RCS signatures are somewhat lower than the measured RCS signatures. The differences can be attributed to slight surface roughnesses of the measured aluminized shroud, while the conventional predictions assumed smooth flat surfaces. The surface roughness of the aluminized shroud can be associated with non-specular diffuse scattering from the LMS material. Larger differences between predicted RCS and measured RCS have been observed by the inventors in relation to the U.S. Navy's proposed LMS RAS material.

In the U.S. Navy testing, the present invention demonstrably afforded improved RCS predictions vis-à-vis' the above-discussed conventional RCS predictions. The two inventive approaches described hereinbelow, which the inventors devised and investigated in order to improve the accuracy of the RCS predictions, are methodologically similar insofar as using measured data. The first inventive approach obtains RCS predictions based on measured monostatic backscattering data from a pyramid. The second inventive approach obtains RCS predictions based on measured monostatic backscattering data from a flat plate. According to each approach, the measured monostatic backscattering RCS is divided by the total area of the measured object, thus yielding RCS values per unit are as a function of azimuth. These RCS values per unit area as a function of azimuth are then applied to a "faceted" computer model of the measured object.

EXAMPLE 1

Figure 4:
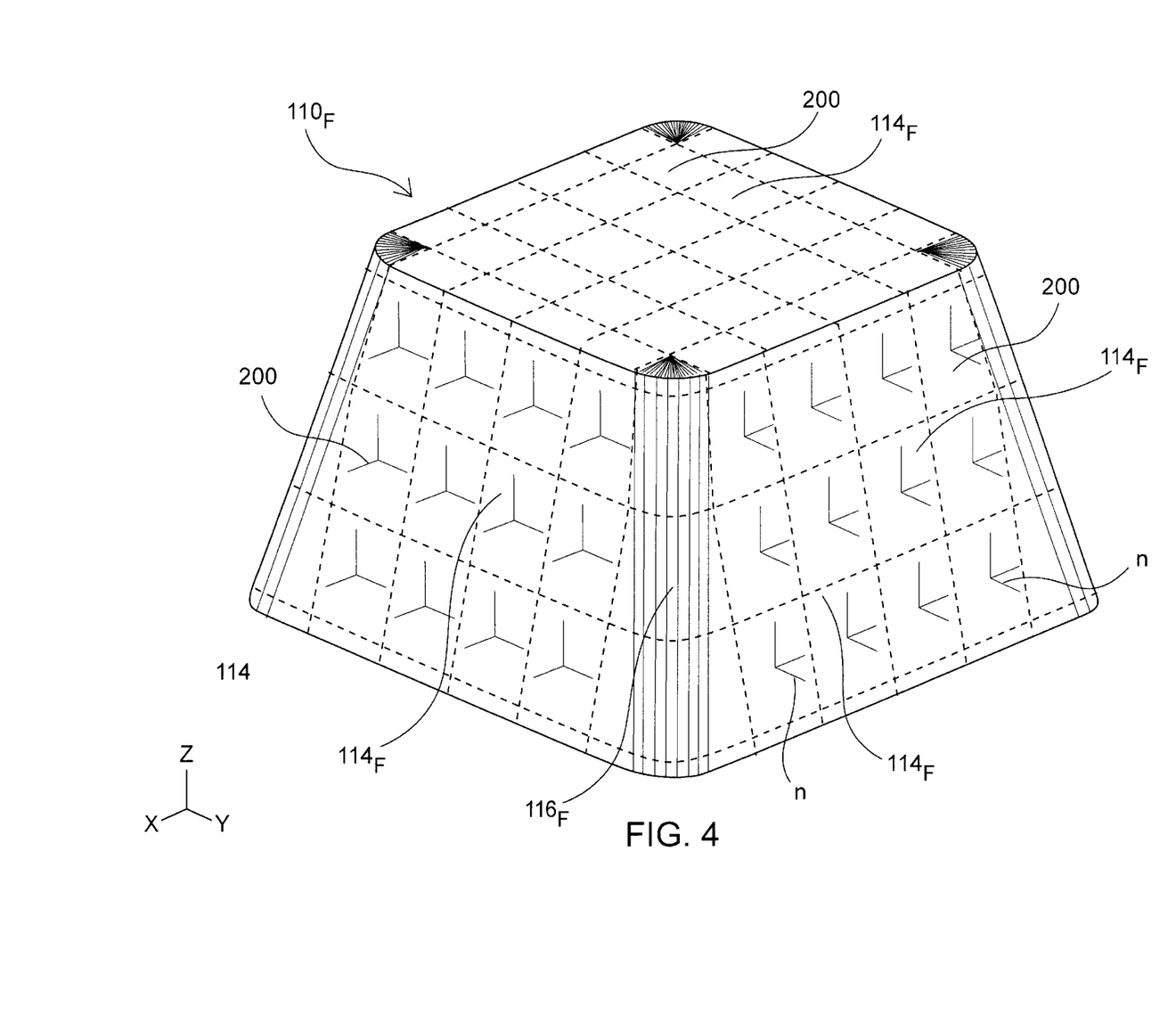
FIG. 4 is a diagrammatic perspective view, based on a computer rendering, of a pyramid geometry representing 3-D scattering elements on the flat surfaces of the pyramid faces, wherein normal vectors point away from the pyramid faces, in accordance with the present invention; this figure illustrates the present invention's application of 3-D scattering using measured pyramid data.

Referring to FIG. 4, according to the first inventive approach, the inventive practitioner sub divides the basic computer-modeled shroud geometry 100 into 1-foot by 1-foot elements, modeling each element as a "3-dimensional scatterer" 200. Thus subdivided, "unfaceted" computer-modeled shroud geometry 100 becomes "faceted" computer-modeled shroud geometry $100_F$, shown in FIG. 4. Essentially, the "facets" of computer-modeled shroud geometry $100_F$ are defined by the three-dimensional scatterering elements 200. The measured RCS signature (i.e., the measured monostatic backscattering RCS) is divided by the total area of the two pyramidal faces (the total area is azimuth-dependent) in order to obtain the RCS values per unit area (in this case per 1 square foot) as a function of azimuth.

The RCS per unit area values are then applied to the inventively "faceted" computer model $100_F$ which is shown in FIG. 4. A better fit of the geometry shape can be achieved by reducing the element 200 size to 3-inch by 3-inch elements or smaller, thus increasing the number of elements 200. According to this inventive method, the RCS of the unit scattering element as a function of azimuth incorporates scattering from the faces $114_F$ and rounded edges $116_F$ of the computer-modeled pyramid $100_F$.

FIG. 4 depicts the geometry representation of the subdivided scaled shroud, inventively faceted computer model $100_F$ as input for the RTS prediction code. An RTS prediction code is used in association with three-dimensional scattering elements 200 according to inventive signature prediction methodology, similarly as an RTS prediction code is used in association with "primitives" according to conventional signature prediction methodology.

Note that each scattering element 200 is represented as a "three-dimensional scatterer," with the normal vector n pointing away from the corresponding face $114_F$ of the inventively modeled faceted pyramid $100_F$. No scattering elements 200 are located on the rounded corners $116_F$. The modeled faceted pyramid $100_F$ itself is assumed to be covered by a radar absorbing material (−300 dB) to eliminate any scattering that would ensue from the modeled conducting scaled pyramid 10; accordingly, only the 3-dimensional scattering elements 200 will contribute to the signature.

Figure 5:
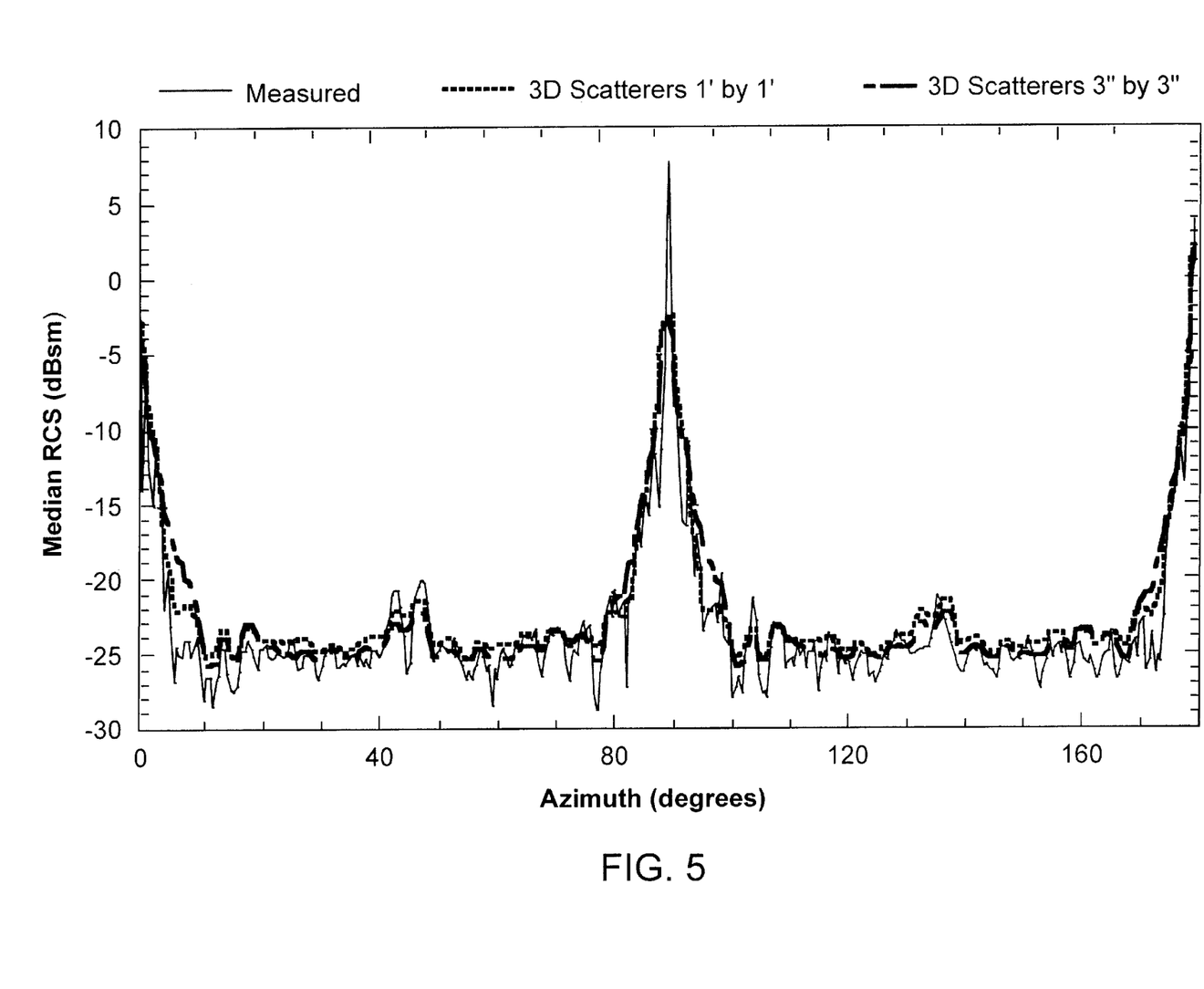
FIG. 5 is a graphical representation of a comparison of the measured RCS of a conducting pyramid and the predicted RCS of a conducting pyramid in accordance with the present invention; the inventive predictions used 3 inch by 3 inch and 1 foot by 1 foot 3-D scattering elements, respectively; the graph compares measured and predicted RCS of a perfect electrical conductor (PEC) pyramid at 8.5–9.5 GHz, HH-polarization.

With reference to FIG. 5, the graph illustrates a comparison of the measured RCS signatures of pyramid 10 and the inventively predicted RCS signatures based on monostatic measurement data for an actual scaled pyramidic shape. Inventively predicted RCS signatures were obtained using 1-foot by 1-foot scattering elements 200 (such as shown in FIG. 4). Other inventively predicted RCS signatures were separately obtained using 3-inch by 3-inch scattering elements 200. The measured and inventively predicted RCS signatures demonstrate very good agreement.

EXAMPLE 2

In the second inventive approach, the inventors used measured monostatic backscattering data from a flat plate (not shown) that had similar surface reflection characteristics as the actual scaled pyramid 10, and the same elevation angle as the faces 14 of pyramid 10. This is a more general approach as compared with the first inventive approach. The second inventive approach can be used for both radar and acoustic signature extrapolations.

According to the second inventive approach, the monostatic backscattering RCS is divided by the total area of the measured flat plate. This is similar to the first approach, wherein the monostatic backscattering RCS is divided by the total area of the measured pyramid 10. Again, the obtained RCS values per unit area as a function of azimuth (in this case the inventors chose 3-inch by 3-inch unit area) are used to model 3-dimensional scattering element responses.

In Example 1, above, the inventively predicted RCS signatures are based on monostatic measurement data obtained for an actual pyramidic shape such as shown in FIG. 1; in the signature predictions, there is an idealized assumption that radar absorbing material (RAM) is applied to the pyramid geometry. As distinguished from the inventively predicted RCS signatures of Example 1, here in Example 2 the inventively predicted RCS signatures are based on monostatic measurement data obtained for an actual plate-like shape. In Example 1, the inventive prediction utilizes measured aluminized pyramid data. In Example 2, the inventive prediction utilizes measured panel data. In either example, the actual object from which monostatic measurement data is obtained is made of the same material as the object of interest (e.g., a full-scale, compound, target object).

Figure 6:
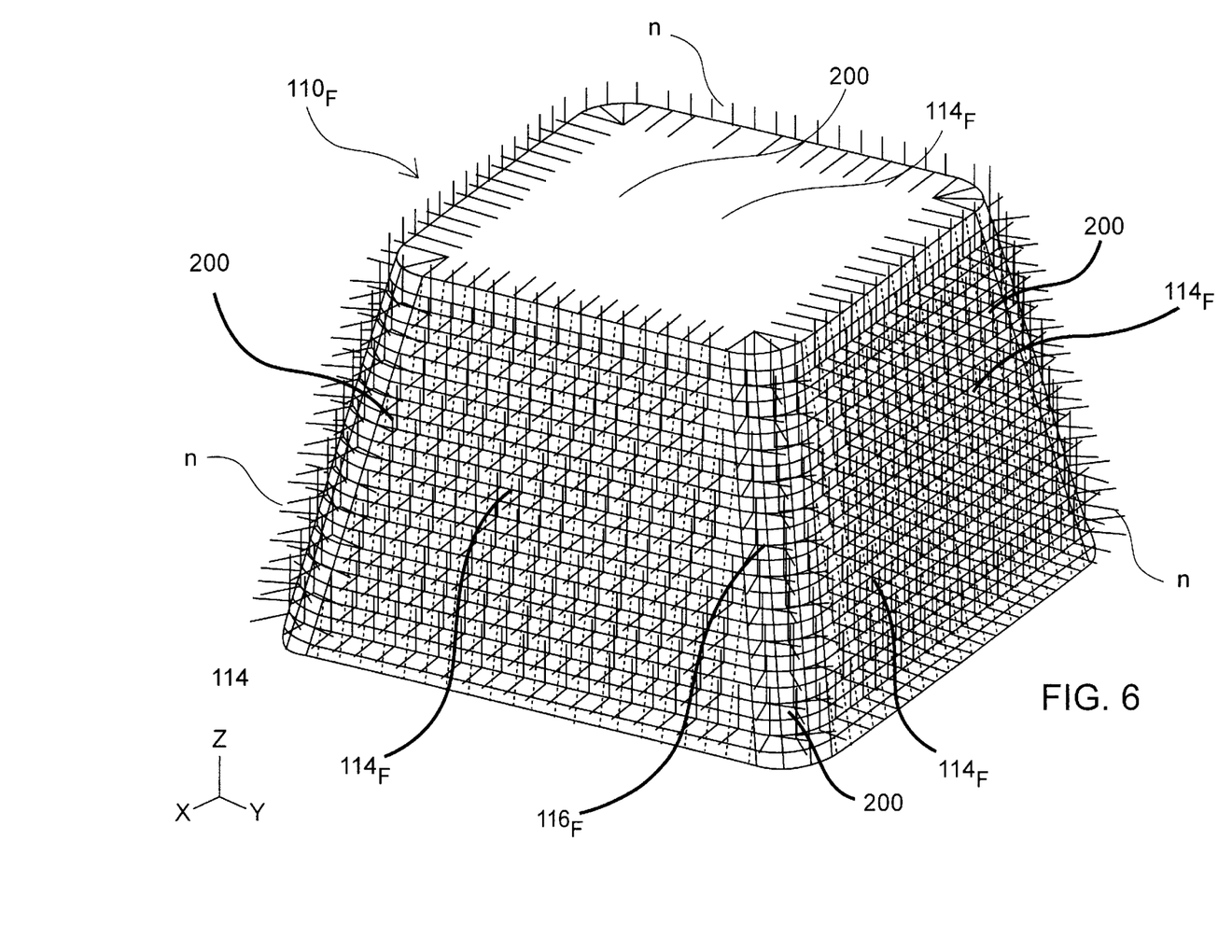
FIG. 6 is a diagrammatic perspective view, based on a computer rendering, of a pyramid geometry representing 3-D scattering elements on the flat surfaces of the pyramid faces and the rounded surfaces of the pyramid edges (corners), in accordance with the present invention; this figure illustrates the present invention's application of 3-D scattering using measured panel data.

Now referring to FIG. 6, which shows an inventively modeled faceted pyramid $100_F$ which differs from the inventively modeled faceted pyramid $100_F$ shown in FIG. 4, each 3-dimensional scattering element 200 occupies a 3-inch by 3-inch area on the flat surface of the pyramid $100_F$. According to Example 1, the present invention models so that 3-D scatterers 200 are absent at the corners 116; in contrast, according to Example 2, the present invention models so that 3-D scatterers 200 are present at the corners 116. In the initial testing according to Example 2, thirty-six 3-D scattering elements 200 were placed in each pyramid corner $116_F$.

In both FIG. 4 and FIG. 6, pyramid $100_F$ is a geometric representation which, like unfaceted pyramid 100, is characterized by an overall configuration, in terms of surface contours, which comports with that of the actual scaled object 10. The rounded corners $116_F$ can be represented by smaller elements 200 (or 180 scatterers 200 per corner) to account for the curvature of the rounded corners 116. Comparison of the measured RCS and the predicted signatures of the proposed LMS material demonstrates very good agreement.

Figure 7:
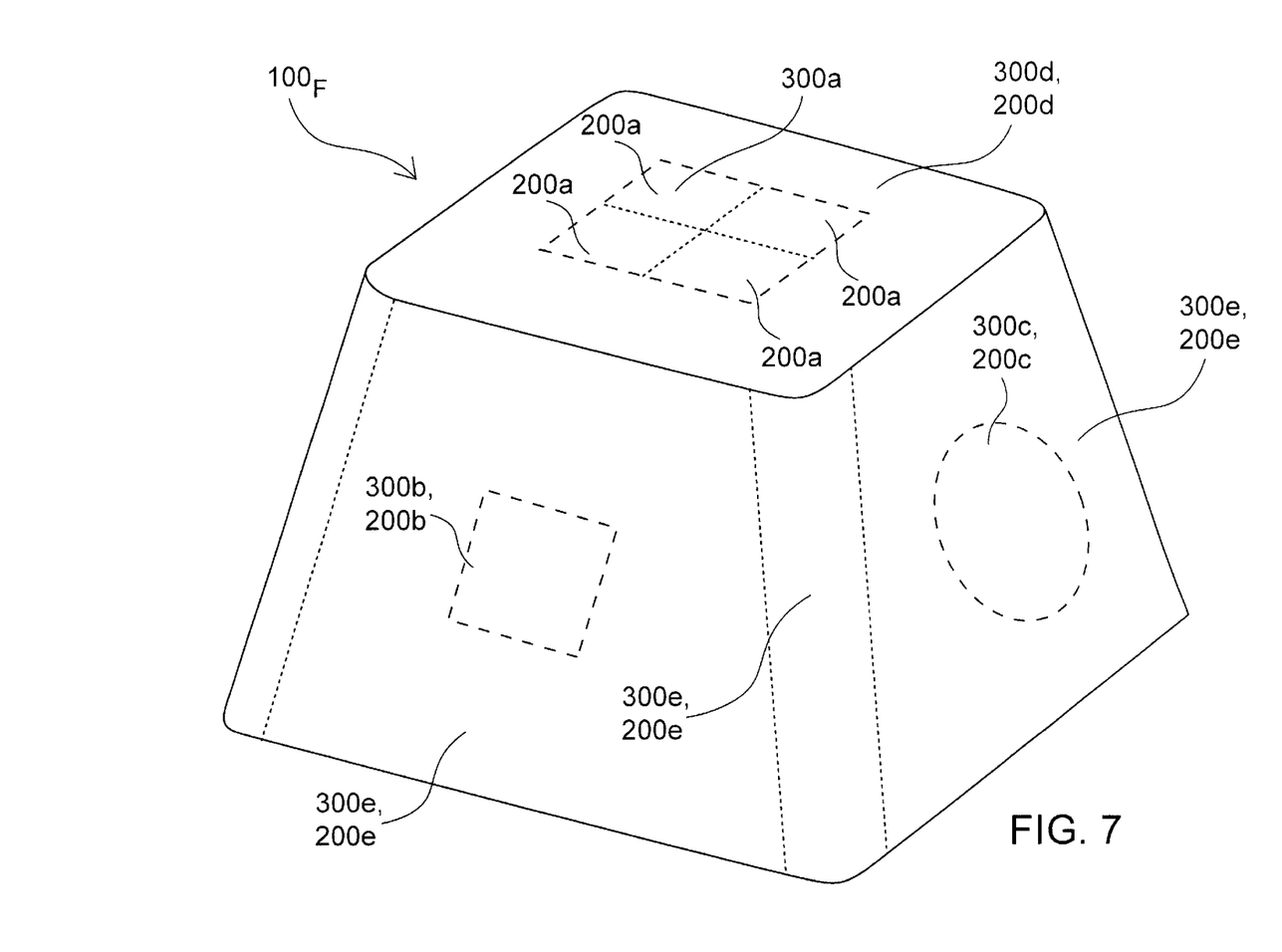
FIG. 7 is a diagrammatic perspective view of a pyramid geometry representing areas of the pyramid which are characterized by different incoherent unit area RCS values. Each pyramid area includes one or more 3-D scattering elements, each of which is assigned the same RCS value.

Accordingly, the testing described herein manifests a remarkable accuracy of the present invention's signature extrapolation methodology. It is pointed out that Example 1 and Example 2 involve inventive extrapolations wherein the RCS per unit area is assumed to be uniform throughout the object of interest. With reference to FIG. 7, the inventively modeled faceted pyramid $100_F$ is shown to be regionalized into plural zones 300, wherein each zone 300 is characterized by its own RCS per unit area value, and wherein each zone 300 is characterized by a RCS per unit area value which differs from every other RCS per unit area value.

For illustrative purposes, zones 300a, 300b, 300c, 300d and 300e are delineated in the inventively modeled faceted pyramid 100$_F$ shown in FIG. 7. Each zone 300 can be conceived to include at least one three-dimensional scatterering element 200. Zone 300a includes four scatterering elements 200a, thus illustrating how plural scatterering elements 200 can be encompassed by a given zone 300. Every three-dimensional scatterering element 200 within the same zone 300 is characterized by the identical RCS per unit area value.

Each RCS per unit area value is obtained through an inventive process such as described herein in Example 1 or Example 2. Therefore, if there are two or more different materials in the object of interest wherein each material characterizes a particular zone, then each material (and the zone which the material characterizes) will have associated therewith its own RCS per unit area value which, in all likelihood, differs from every other RCS per unit area value in the object of interest; hence, in such situations, every RCS per unit area value must be separately determined prior to being incorporated in the same inventively modeled faceted pyramid 100$_F$.

The most accurate alternative to inventive practice is to make signature measurements of the full size system; however, in many cases such an alternative is not viable either because the system does not exist or because of the inordinate expense associated with the requisite fabrication of the full size target or system. Predictions using existing computer codes are not accurate because of inherent approximations or size limitations due to computer memory requirements and processing speed.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. A method for determining a monostatic electromagnetic signature of an entity, the method comprising:
    producing a real representation of said entity, said real representation being characterized by at least one geometric surface area, each said geometric surface area having associated therewith a geometric surface area value;
    ascertaining at least one monostatic radar cross-section per-unit-area value for said real representation, wherein for each said monostatic radar cross-section per-unit-area value said ascertaining includes:
        obtaining a monostatic radar cross-section value of said real representation; and
        performing a mathematical division of said monostatic radar cross-section value by a said geometric surface area value;
    producing a virtual representation of said entity, wherein said entity includes a plurality of geometric three-dimensional regions, each said geometric three-dimensional region having associated therewith a said monostatic radar cross-section per-unit-area value; and
    performing a mathematical incoherent summation of said monostatic, radar cross-section per-unit-area values associated with said geometric three-dimensional regions, thereby obtaining a monostatic radar cross-section value of said entity.

2. The method according to claim 1, wherein said obtaining a monostatic radar cross-section value of said real representation includes measuring or calculating said monostatic radar cross-section-value of said real representation as a function of aspect angle.

3. The method according to claim 1, wherein said monostatic radar cross-section value of said real representation is obtained as a function of aspect angle and frequency.

4. The method according to claim 3, wherein said obtaining a monostatic radar cross-section value of said real representation includes measuring or calculating said monostatic radar cross-section value of said real representation as a function of aspect angle and frequency.

5. The method according to claim 1, wherein every said monostatic radar cross-section value is a function of aspect angle.

6. The method according to claim 1, wherein every said monostatic radar cross-section value is a function of aspect angle and frequency.

7. The method according to claim 1, wherein:
    said real representation is characterized by at least one material composition characterizing said entity;
    each said geometric surface area has associated therewith a said material composition; and
    each said geometric three-dimensional region has associated therewith a said material composition, said material composition being associated with said geometric surface area with which is associated said geometric surface area value used in said ascertaining of said monostatic radar cross-section per-unit-area value.

8. A method for determining the signature of a target object, said method comprising providing a sample object and extrapolating signature information from said sample object to said target object, said sample object having a total surface area and being at least substantially composed of the, same material as said target object, said extrapolating comprising:
    evaluating the monostatic backscattering cross section per unit surface area of said sample object as a function of aspect angle and frequency, said monostatic backscattering cross section being selected from the group consisting of monostatic radar cross section and monostatic acoustic target strength, said evaluating including finding said monostatic backscattering cross section of said sample object, said evaluating further including averaging said found monostatic backscattering cross section of said sample object with respect to said total surface area of said sample object;
    generating a computer model of said target object, said computer model indicating plural three-dimensional sections of said target object whereby each said three dimensional section is characterized by said monostatic backscattering cross section per unit surface area of said sample object; and
    finding the monostatic backscattering cross section of said target object as a function of aspect angle and frequency, said finding including incoherently summing said three-dimensional sections in terms of said monostatic backscattering cross section per unit surface area of said sample object.

9. A method for determining the backscatter radar cross section of a target object which includes a backscatter area, said-method comprising:
    rendering a sample object so that said sample object includes a backscatter area and is characterized by the same material as said target object;
    obtaining a value for the backscatter radar cross section of said sample object, said backscatter radar cross section of said sample object corresponding to the backscatter radar return of said sample object in a selected direction as a function of aspect angle with respect to said backscatter area of said sample object;

calculating a value for the backscatter radar cross section per unit area of said sample object said calculating including relating said obtained value for said backscatter radar cross section of said sample object to a value for said backscatter area of said sample object, said backscatter radar cross section per unit area of said sample object corresponding to the normalized radar return of said sample object in a selected direction as a function of aspect angle with respect to said backscatter area of said sample object;

modeling said target object, said modeling including representing a plurality of three-dimensional scattering elements and assigning said value for said backscatter radar cross section per unit area of said sample object to each said three-dimensional scattering element, each said three-dimensional scattering element being included by said target object and including a section of said backscatter area of said target object; and performing an incoherent summation of said values for said backscatter radar cross section per unit area of said sample object which are assigned to said three-dimensional scattering elements so as to obtain a value for the backscatter radar cross section of said target object, said value for said backscatter radar cross section of said target object corresponding to the backscatter radar return of said target object in a selected direction as a function of aspect angle with respect to the backscatter area of said target object.

10. The method as defined in claim 9, wherein said sample object has a shape selected from the group consisting of:

scale model of said target object; and flat plate.

11. The method as defined in claim 9, wherein said obtaining of a value for the backscatter radar cross section of said sample object includes at least one of:

obtaining a measurement of the backscatter radar cross-section of said sample object; and obtaining a high-fidelity prediction of the backscatter radar cross-section of said sample object.

12. The method as defined in claim 9, wherein said obtaining a value for said backscatter radar cross section for said sample object includes either or both of:

measuring said backscattering cross section of said sample object;

calculating said backscattering cross section of said sample object.

* * * * *